United States Patent [19]

De Simone et al.

[11] Patent Number: 4,755,497

[45] Date of Patent: Jul. 5, 1988

[54] PREPARATON OF COPPER ALUMINUM BORATE CATALYST AND OPTIONAL IMPROVEMENT OF THE CATALYST BY INCORPORATION WITH ACTIVE METALS

[75] Inventors: Richard E. De Simone, Lisle; Eric J. Moore, Naperville; Bruce I. Rosen, Morton Grove, all of Ill.

[73] Assignee: Amoco Corporation, Chicago, Ill.

[21] Appl. No.: 924,064

[22] Filed: Oct. 28, 1986

[51] Int. Cl.$^4$ .................. B01J 21/02; C01B 15/12
[52] U.S. Cl. .................. 502/202; 502/204; 502/206; 502/207; 423/279
[58] Field of Search .............. 502/202, 204, 206, 207, 502/346; 423/279

[56] References Cited

U.S. PATENT DOCUMENTS

| | | | |
|---|---|---|---|
| 1,956,585 | 5/1934 | Oglesby et al. | 502/185 X |
| 1,977,718 | 10/1934 | Dreyfus | 518/713 |
| 3,856,702 | 12/1974 | McArthur | 502/204 |
| 3,856,705 | 12/1974 | McArthur | 502/202 |
| 3,971,735 | 7/1976 | Osano et al. | 502/202 |
| 3,985,682 | 10/1976 | Cull et al. | 502/346 |
| 3,990,995 | 11/1976 | McArthur | 502/207 |
| 4,024,171 | 5/1977 | McArthur | 502/207 |
| 4,034,061 | 7/1977 | McArthur | 502/204 X |
| 4,040,980 | 8/1977 | Matsuda et al. | 502/346 |
| 4,048,114 | 9/1977 | Saunders | 502/346 |
| 4,105,588 | 8/1978 | Balducci et al. | 502/346 X |
| 4,354,960 | 10/1982 | Hammer et al. | 502/206 X |
| 4,386,017 | 5/1983 | Nakamura et al. | 502/174 X |
| 4,504,597 | 3/1985 | Klar et al. | 502/346 X |
| 4,590,324 | 5/1986 | Solek | 585/444 |
| 4,613,707 | 9/1986 | Kouba et al. | 568/885 X |
| 4,645,753 | 2/1987 | Zletz et al. | 502/202 |

FOREIGN PATENT DOCUMENTS

| | | | |
|---|---|---|---|
| 2449493 | 4/1975 | Fed. Rep. of Germany | 502/202 |
| 2365001 | 7/1975 | Fed. Rep. of Germany | 518/713 |
| 1454557 | 11/1973 | United Kingdom . | |

*Primary Examiner*—Helen M. S. Sneed
*Assistant Examiner*—William G. Wright
*Attorney, Agent, or Firm*—Matthew R. Hooper; William H. Magidson; Ralph C. Medhurst

[57] ABSTRACT

The invention is a solid state preparation of copper aluminum borate catalyst comprising: dry mixing solid reagents comprising suitable precursors of copper oxide (CuO), aluminum oxide ($Al_2O_3$) and boron oxide ($B_2O_3$) with a solid binder which aids compaction of the solid reagents, is essentially inert to said reagents, and burns away upon calcination, said dry mixing resulting in formation of a superficially dry copper aluminum borate precursor; compacting the dry precursor; and calcining the precursor at a sufficiently high temperature to form crystalline copper aluminum borate.

33 Claims, No Drawings

PREPARATON OF COPPER ALUMINUM BORATE CATALYST AND OPTIONAL IMPROVEMENT OF THE CATALYST BY INCORPORATION WITH ACTIVE METALS

The present invention relates to an improved method for preparing copper aluminum borate catalyst. In one aspect the invention involves a dry, solid-state preparation of the catalyst which comprises (1) dry-mixing solid reagents comprising suitable precursors of copper oxide (CuO), aluminum oxide ($Al_2O_3$), and boron oxide ($B_2O_3$) with at least about 3 wt. percent on a dry solids basis of a suitable solid binder to form a superficially dry copper aluminum borate precursor; (2) compacting the dry precursor; and (3) calcining the precursor at a sufficiently high temperature to form crystalline copper aluminum borate. Preferably, copper aluminum borate prepared according to the present invention is promoted by incorporation of an effective amount, preferably about 0.01 to about 30 wt. percent, of one or more active metals. Such incorporation can be accomplished by (a) including the metal, or metal compound, as a solid reagent, in the dry-mix of solid reagents constituting the copper aluminum borate precursor prior to calcining; (b) treating the dry-mixed precursor with a solution containing the metal or metal compound; or (c) incorporating the active metal in the calcined catalyst. The present invention is also directed to a method for preparing a copper aluminum borate precursor comprising step (1) above.

Catalytically active copper aluminum borate which is at least partially reducible with hydrogen under Temperature Programmed Reduction (TPR) at a temperature no more than 350° C. and which has a surface area of at least 5 square meters per gram and a pore volume of at least 0.04 cc per gram is the subject of commonly assigned copending applications of Zletz U.S. Ser. Nos. 709,790 and 710,015 now abandoned; of Zletz et al. U.S. Ser. Nos. 710,042 now abandoned and 711,235 now U.S. Pat. No. 4,645,753; of Kouba et al. U.S. Ser. No. 710,016 now U.S. Pat. No. 4,613,707; and of commonly assigned Satek U.S. Pat. No. 4,590,324. These applications disclose the preparation, characterization and utility of copper aluminum borate and are hereby incorporated by reference.

By way of general background, McArthur, in U.S. Pat. Nos. 3,856,702, 3,856,705 and 4,024,171, discloses that it has long been the practice in the art to impregnate or otherwise distribute active catalytic metals upon support materials having desired properties of porosity, surface area, thermal and mechanical stability, and suitably inert chemical properties. McArthur teaches that a superior catalyst support results from calcining certain alumina-aboria composites within the temperature range of about 1,250° C.–2,600° F., which appears to produce a definite crystalline phase of 9 $Al_2O_3.2B_2O_3$ and also, in most cases, a crystalline phase of $Al_2O_3.B_2O_3$, following which the aluminum borate support can be impregnated with solution(s) of desired catalytic salt or salts, preferably those that are thermally decomposable to give the corresponding metal oxides. Following impregnation, the finished catalysts are dried and, if desired, calcined at temperatures of, e.g., 500° to 1000° F. In the final catalyst, the active metal or metals may appear in the free form as oxides or sulfides or any other active form. Examples 1 to 6 of McArthur impregnate the calcined support with an aqueous solution of copper nitrate and cobalt nitrate to provide about 4% copper as CuO and 12% cobalt as $Co_2O_3$ in the final catalyst.

Addressing preparation of the aluminum-boria support, McArthur states that conventional compounding procedures may be employed in compositing the alumina and the boria. He explains that it is necessary to provide an intimate admixture of the finely divided materials such as may be achieved by grinding, mulling, or ball milling the dry powders together, following which the mixture is shaped into a porous, self-supporting aggregate, as by tableting, prilling, extruding, casting or other well-known techniques to form cylindrical pellets or extrudates, spheres or other granular forms. Nothing in McArthur discloses or suggests a solid-state preparation of copper aluminum borate in which a superficially dry mixture comprising powdered solid reagents which are precursors of alumina, boria, and the desired metal oxide are calcined to form the catalyst, such being distinguishable from McArthur's catalyst preparation which involves initial formation of the calcined alumina-boria support followed by post-treatment with the active metal.

Uhlig discloses preparation of a green tetragonal solid copper aluminum borate having the structure $Cu_2Al_6B_4O_{17}$ in Diplomarbeit, Institute for Crystallography, Aacken (October 1976) "Phasen - und Mischkristall - Bildung im $B_2O_3$ - armeren Teil des Systems $Al_2O_3$-CuO-$B_2O_3$" ("Formation of Phases and Mixed Crystals in that Part of the $Al_2O_3$-CuO-$B_2O_3$ System With a Low $B_2O_3$ Content") which is hereby incorporated by reference, by grinding together solid boron oxide, copper oxide and alumina, sealing the ground metal oxides in a platinum tube and heating same at 1000° C. over the heating period of 48 hours. Attempts to produce this copper aluminum borate by the indicated route yields well-defined, dense crystalline particles which have an extremely low surface area and are accordingly not suitable for many catalysis processes due to the low porosity and surface area.

Asano, in U.S. Pat. No. 3,971,735, discloses a copper, zinc, aluminum and boron catalyst useful in low temperature methanol synthesis. The catalyst is preferably produced by forming a mixture of water-soluble salts of copper, zinc and boron, precipitating same with an alkali carbonate and mixing with alumina. The catalyst is then fired at approximately 300°–450° C.

Most recently, commonly assigned Satek U.S. Pat. No. 4,590,324 discloses preparation of catalytically active copper aluminum borate in a liquid medium which comprises (1) combining a source of divalent copper, trivalent aluminum and boron in the form of the oxide or borate, (2) drying the composition to remove water or diluent if necessary and (3) calcining the composition at a temperature sufficiently high to form crystalline copper aluminum borate having an X-ray diffraction pattern of $Cu_2Al_6B_4O_{17}$. Satek states that, while copper aluminum borate can be prepared by various techniques, it is generally preferred to combine the oxide precursor reagents in an aqueous medium and that the presence of volatile components in the preparation of copper aluminum borate, such as water, $NH_3$, acetate, etc., is advantageous in providing the copper aluminum borate with sufficient surface area and porosity for catalysis.

Although the liquid preparation of copper aluminum borate generally described in Satek is capable of producing an active and selective catalyst, recent work has determined there are a number of handling and processing problems confronting large scale liquid preparation of the catalyst. First, the liquid premix comprising the oxide precursors normally contains more than 50% by weight liquid. Removal of the liquid by air drying to obtain a suitable dry copper aluminum borate precursor composition is uneconomical, time consuming and further complicated by sensitivity of the thixotropic liquid reagent mixture to agitation and a tendency to undergo phase separation upon drying. A further problem is difficulty in achieving homogeneity in the liquid medium which is important for catalyst reproducibility. While a number of techniques, such as spray drying, are available to counteract these problems, none have proven totally satisfactory on a large scale.

Accordingly, there is need for a streamlined and reproducible solid-state (i.e., dry) preparation of copper aluminum borate capable of being carried out absent liquid or liquified reagents. Before the present invention, attempts to prepare copper aluminum borate from dry-mixed solid reagents (containing only water of hydration) did not lead consistently to satisfactory catalyst materials, and in some cases, copper aluminum borate was not formed.

An additional need exists for a convenient method of preparing copper aluminum borate which results in a catalyst for conversion of para-ethyltoluene to para-methylstyrene which is susceptible to enhancement by doping with active metals.

Satek discloses that the optimum copper aluminum borate catalyst for dehydrogenating alkylaromatics will vary for each individual feed. Consistent with this, our recent work with the previously disclosed liquid prepared catalyst has encountered the problem that, where the catalyst is intended for use in dehydrogenation of para-ethyltoluene to para-methylstyrene, incorporation into the catalyst of active metals as a means of improving catalyst performance is accompanied by the unwanted side effect of lowering selectivity of the catalyst to para-methylstyrene.

It is therefore a general object of the present invention to provide an improved method for preparing copper aluminum borate and, in particular, to provide an economical and reproducible solid-state method for preparing copper aluminum borate from dry-mixed solid precursor reagents such that the resulting catalyst is at least comparable to that produced according to the liquid techniques previously disclosed.

It is a further object of the invention to provide an improved method for preparing copper aluminum borate which results in a catalyst for conversion of para-ethyltoluene to para-methylstyrene which can be markedly enhanced by incorporation of relatively small amounts of active metals. Other objects appear hereinafter.

It has now been found that the objects of this invention are provided for in an improved method for preparing copper aluminum borate which comprises: (1) dry-mixing solid reagents comprising suitable precursors of copper oxide (CuO), aluminum oxide ($Al_2O_3$) and boron oxide ($B_2O_3$) with at least about 3 wt. percent of a suitable solid binder to form a superficially dry copper aluminum borate precursor; (2) compacting the precursor; and (3) calcining the precursor at a sufficiently high temperature to form crystalline copper aluminum borate. Among the advantages offered by the present invention is that it eliminates the need to employ liquids in the preparation of copper aluminum borate precursor, thus greatly simplifying the overall preparation of the catalyst. The method also enhances the consistency (i.e., reproducibility) of the catalyst and enables the catalyst to be improved by incorporation of active metals. Because the solid binder is destroyed during calcination, porosity and surface area can be controlled without relying upon the presence of liquified volatile components during preparation of the copper aluminum borate precursor.

As stated above, the solid-state method for preparing copper aluminum borate according to the present invention enables the catalyst to be improved by incorporation of one or more active metals. Thus, the method of catalyst preparation summarized above preferably includes incorporation of an effective amount, preferably 0.01 to about 30 wt. percent, of one or more active metals into the copper aluminum borate by (a) including the metal, or metal compound, as a solid reagent, in the dry-mix of solid reagents constituting the copper aluminum borate precursor prior to calcining; (b) treating the dry-mixed precursor with a solution containing the metal or metal compound; or (c) incorporating the metal in the calcined catalyst. Although any active metal, metal compounds, or mixtures thereof may be used, the catalyst is preferably incorporated with at least one member selected from the group consisting of platinum, palladium and molybdenum. Most preferred is a molybdenum/palladium combination.

The present invention is also directed to an improved method for preparing a copper aluminum borate precursor which comprises step (1) in the above-summarized solid-state method.

Throughout the present specification and claims, the terms "dry," "dry-mixed," "solid-state," "solid" and "superficially dry" are intended to denote conditions, processes, or reagents which are essentially free of liquid materials. These terms are not intended to exclude the presence of ambient atmospheric moisture or the water of hydration in solid reagents. The terms "precursor," "copper aluminum borate precursor," "dry-mixed precursor," etc., denote compositions which, upon calcination at a sufficiently high temperature, result in crystalline copper aluminum borate.

In the discussion that follows, reference is made to Temperature Programmed Reduction. As discussed in Zletz copending U.S. Ser. No. 709,790 and Satek U.S. Pat. No. 4,590,324 (hereby incorporated by reference), this test was carried out by placing $1.5 \times 10^{-4}$ moles of copper aluminum borate in a 0.6 mm outside diameter vycor tube heated by an electric furnace. The tube was purged with helium or argon by heating to 300° C. After cooling to ambient temperature, the gas feed to the vycor tube was switched to either 5% CO in He or 5% $H_2$ in Ar and the temperature was ramped to about 850° C. at 8° C./min. The temperature was controlled and ramped by a programmer equipped with a temperature controller. The change in gas composition of the effluent was detected with a thermal conductivity cell equipped with output to a strip-chart recorder. The carbon dioxide formed was removed from the effluent by a bed of ascarite and the water formed was removed by magnesium perchlorate. Unless otherwise stated, pore volume, surface area and average pore radius was determined by BET nitrogen adsorption (desorption test).

Zletz U.S. Ser. No. 709,790 states that copper aluminum borate ($Cu_{2-x}Al_{6-y}B_4O_{17}M_mM'_nM''_y$ wherein M is a divalent metal, M' is a monovalent metal, m ranges from 0 to 0.8, n ranges from 0 to 1.6, X ranges from 0 to 0.8 and is equal to the sum of m+n/2, M" is a trivalent metal and y ranges from 0 to 1.2) which is at least partially reducible with hydrogen under Temperature Programmed Reduction conditions at a temperature no more than 350° C., preferably having a surface area of at least 5 m² per gram and a pore volume of at least 0.04 cc per gram, is a new catalyst and further that copper aluminum borate can be treated with a reducing agent to form a catalyst comprising finely divided metallic copper (zero valent copper) on a support comprising an aluminum borate. Part of the copper in the copper aluminum borate reacts with a reducing gas at relatively low temperature (about 175° to 350° C.) to form finely divided copper on the aluminum borate support, whereas the highly crystalline copper aluminum borate of Uhlig having a surface area of 0.2 m²/g or less does not start to react with hydrogen until about 475° C. When Temperature Programmed Reduction was used to distinguish the Uhlig crystalline material having a surface area of 0.2 m²/g versus the higher surface area material of this invention, it was found by Zletz that (1) copper aluminum borate of his invention having a surface area of 86 m²/g started to be reduced with hydrogen at 175° C., had a sharp peak, about 75% of the theoretical amount of hydrogen had reacted by 416° C. and about 86% of the theoretical amount of hydrogen was consumed by the time the temperature reached 700° C., (2) copper aluminum borate having a surface area of 7 m²/g started to be reduced at 246° C., had a broad peak, and the theoretical amount of hydrogen was consumed at 842° C. and (3) the copper aluminum borate of Uhlig did not begin to react with hydrogen until about 475° C., did not have a peak and was still slowly reacting with hydrogen at 842° C. at which point 16% of the theoretical amount of hydrogen had been consumed and after standing at 842° C. for 27 minutes the experiment was stopped with a total hydrogen consumption of 27% of theory. Accordingly, the higher surface area copper aluminum borate of this invention reacts at a much lower temperature, at a faster rate and more completely than Uhlig's lower surface area copper aluminum borate.

When copper aluminum borate is used as a catalyst in the dehydrogenation of organic compounds or in a reaction medium containing a reducing gas, at least part of the copper in the copper aluminum borate is converted into finely divided copper on an aluminum borate support. In some reactions, such as in the dehydrogenation of alkylaromatics to alkenylaromatics, substantially all of the copper in the still active catalyst can be present as finely divided copper metal on an aluminum borate support, i.e., in the aluminum borate matrix. In other cases, the active catalyst always contains some copper aluminum borate. If part of the copper in copper aluminum borate is replaced with another divalent metal, for example zinc or nickel, copper in the compound is still reducible to metallic copper at relatively low temperature.

If neat copper aluminum borate having the empirical formula $Cu_2Al_6B_4O_{17}$ is viewed as having the structure $3Al_2O_3.2CuO.2B_2O_3$, the reduction with CO or $H_2$ can be represented in its simplest terms as follows:

$$3Al_2O_3.2CuO.2B_2O_3 + 2H_2 \rightarrow 3Al_2O_3.2B_2O_3 + 2Cu + 2H_2O$$

$$3Al_2O_3.2CuO.2B_2O_3 + 2CO \rightarrow 3Al_2O_3.2B_2O_3 + 2Cu + 2CO_2$$

X-ray diffraction patterns of the products indicate that the aluminum borate crystal has the formula $2Al_2O_3.B_2O_3$ and that part of the $B_2O_3$ in the original copper aluminum borate crystal has been driven off and/or is present in the amorphous state. Partial replacement of the copper in copper aluminum borate with other divalent metals does not appear to interfere with the reduction of the copper to zero valent copper.

Unreduced copper aluminum borates (CuAB) have a distinguishing crystalline structure while substantially fully reduced CuAB (Cu on AB) has a different related crystalline structure as evidenced by the significant lines of their X-ray diffraction patterns. The 5.29 line has arbitrarily been set at 100 for Cu on AB in order to facilitate a comparison with ASTM data for such materials as CuAB and aluminum borate. The X-ray diffraction patterns in Table A show the significant lines for substantially fully reduced CuAB (copper on aluminum borate) of this invention, unreduced CuAB of this invention, CuAB of Uhlig, $Al_4B_2O_9$ and copper.

X-ray data were determined by standard techniques. The radiation was the K-alpha doublet of copper, and a proportional counter spectrometer with a strip chart pen recorder was used. The peak heights, I, and the positions as a function of 2 times theta, where theta is the Bragg angle, were read from the spectrometer chart. From these the relative intensities, 100 $I/I_0$, where $I_0$ is the intensity of the strongest line or peak, and d (obs.), the interplanar spacing in Angstroms, corresponding to the recorded lines, were calculated. In Table A, the relative intensities are given in terms of the symbols VVS=very very strong (>100), VS=very strong (80-100), S=strong (50-80), M=Medium (20-50), W=weak (10-20) and VW=very weak (<10).

TABLE A

| (d) Angstroms | Cu on AB | CuAB | Uhlig CuAB | $Al_4B_2O_9$ | Cu |
|---|---|---|---|---|---|
| 7.50 ± .1 | | VW-M | M | | |
| 5.29 ± .05 | VS | VS | VS | VS | |
| 5.00 ± .05 | | S | S | | |
| 4.92 ± .03 | W-M | | | W | |
| 3.73 ± .03 | | W-M | W | | |
| 3.64 ± .03 | | VW-W | VW | | |
| 3.58 ± .03 | VW-M | | | VW | |
| 3.35 ± .03 | VW-M | W | W | M | |
| 2.98 ± .03 | | VW-W | W | | |
| 2.84 ± .03 | | VW-W | VW | | |
| 2.78 ± .02 | VW | | | | |
| 2.64 ± .02 | M | M-S | M | M | |
| 2.61 ± .02 | | W-M | W | | |
| 2.50 ± .02 | | W-M | VW | | |
| 2.45 ± .02 | W-M | | | W | |
| 2.26 ± .02 | | W-M | W | | |
| 2.22 ± .02 | W | | | VW | |
| 2.16 ± .02 | | M | W | | |
| 2.13 ± .02 | M | | | W-M | |
| 2.07 ± .02 | VVS | M | M | W | S |
| 1.97 ± .02 | VW-W | M | W-M | | |
| 1.91 ± .02 | VW | | VW | VW | |
| 1.86 ± .01 | | W-M | VW | | M |
| 1.81 ± .01 | VVS | M | W | | M |
| 1.76 ± .01 | | VW | VW | | |
| 1.67 ± .01 | W | W-M | W | | |
| 1.60 ± .01 | | W-VW | VW | | |
| 1.555 ± .01 | W | W-VM | VW | W | |

As indicated above, the substantially fully reduced copper aluminum borate X-ray diffraction lines correspond primarily to the X-ray diffraction lines of the $Al_4B_2O_9$ and copper.

The significant X-ray diffraction lines for copper aluminum borate are set forth below in Table B.

TABLE B

| (d) Angstroms | Strength |
|---|---|
| 5.29 ± .05 | VS |
| 5.00 ± .05 | S |
| 3.73 ± .03 | W-M |
| 2.64 ± .03 | M-S |
| 2.61 ± .02 | W-M |
| 2.50 ± .02 | W-M |
| 2.26 ± .02 | W-M |
| 2.16 ± .02 | M |
| 2.07 ± .02 | M |
| 1.97 ± .02 | M |
| 1.86 ± .01 | W-M |
| 1.81 ± .01 | M |

Copper aluminum borate prepared according to the present invention can be used for oxidation, dehydrogenation, conversion of syngas, hydrogenation, etc., as described in copending commonly assigned U.S. Ser. Nos. 709,790 Zletz; 710,016 Kouba et al.; 710,042 Zletz et al.; and Satek U.S. Pat. No. 4,590,324.

As disclosed in Satek, part of the copper salts or aluminum component can be replaced with divalent and/or trivalent metal salts such as nickel acetate, copper acetate, cobalt acetate, zinc acetate, magnesium nitrate, chromic acetate, and ferrous or ferric acetate. Divalent metal ions can appear in the copper aluminum borate as M in the above formula. X-ray diffraction data indicates that zinc, cobalt, nickel and magnesium have been successfully incorporated into copper aluminum borate crystals and, accordingly, X in the above formula can range from about 0.01 to 0.8, preferably about 0.05 to 0.50. Trivalent metal ions can appear as M" in the above formula, e.g., $Fe^{+++}$. However, chromium forms a chromite and appears not to replace aluminum.

While it is generally preferred to produce neat copper aluminum borate or copper aluminum borate/aluminum borate catalysts, the partial replacement of aluminum with chromium in the preparation (about 5 to 25%) yields an excellent hydrogenation catalyst (copper aluminum borate/copper chromite).

If desired, non-volatile cations such as alkali metal (M' in the above formula) or alkaline earth metal cations can be present during the preparation of the copper aluminum borate.

For purposes of this invention, the term "aluminum borate" is used in the generic sense to be inclusive of all aluminum borate compounds, such as pure or neat aluminum borate, copper aluminum borate, and zinc aluminum borate. "Copper aluminum borate" is used in the generic sense to be inclusive of all compounds containing divalent copper, trivalent aluminum and borate comprising the X-ray diffraction pattern of $Cu_2Al_6B_4O_{17}$, such as pure or neat copper aluminum borate, copper zinc aluminum borate, aluminum borate/copper aluminum borate, copper aluminum borate/copper chromite, and copper aluminum borate/alumina.

Briefly, the solid-state preparation of copper aluminum borate according to the present invention comprises (1) dry-mixing solid reagents comprising suitable precursors of copper oxide (CuO), aluminum oxide ($Al_2O_3$) and boron oxide ($B_2O_3$) with at least about 3 wt. percent up to about 20 wt. percent on a dry solids basis of a suitable solid binder to form a superficially dry copper aluminum borate precursor; (2) compacting the dry precursor; and (3) calcining the precursor at a sufficiently high temperature to form crystalline copper aluminum borate. When the present method is employed, expensive and time-consuming procedures to dry the precursor prior to calcining are avoided.

In addition to copper metal itself, and the copper oxides, suitable precursors of copper oxide include any copper salt containing a decomposable anion destroyed during calcination, including without limitation, copper nitrate, basic copper carbonate ($CuCO_3.Cu(OH)_2$) and copper acetate monohydrate. Copper acetate monohydrate is preferred as it behaves well in mixing, releases no noxious fumes in calcination and gives a copper aluminum borate catalyst which for reasons unknown regenerates better than catalyst made from other copper oxide or salt reagents. Suitable precursors of boron oxide include, in addition to the boron oxides, any solid boron-containing reagent, including without limitation, boric acid, copper borate, aluminum borate, ammonium borate, and ammonium hydrogen tetraborate ($NH_4HB_4O_7$). Boric acid and ammonium hydrogen tetraborate preferred. Suitable aluminum oxide precursors include dried aluminas prepared from PHF alumina sol, Nalco 15J-614 colloidal alumina, Davison SRA (alpha) and VHF (alpha) aluminas. Preferred aluminas are Davison VHF (alpha) alumina.

The solid alumina-, boria-, and copper-containing reagents can be combined in approximate stoichiometric proportions sufficient to provide copper aluminum borate having the mixed metal oxide formula $2CuO.3Al_2O_3.2B_2O_3$ or the empirical formula $Cu_2Al_6B_4O_{17}$.

If desired, non-volatile cations such as alkali metal (M' in the earlier discussed formula) or alkaline earth metal cations can be present during the preparation of the copper aluminum borate. For example, it has been found that if finely divided copper aluminum borate is prepared from a composition containing potassium ions and the catalyst is used in the conversion of syngas to methanol, only single carbon chain compounds are produced, e.g., methanol and methyl ethers. If no alkali metal is present during the preparation of the copper aluminum borate but potassium is present as a result of doping the crystalline copper aluminum borate, a mixture of alcohols comprising methanol, ethanol, propanol, etc. is produced.

Suitable alkali metal and alkaline earth metal compounds include the oxides, hydroxides and salts of lithium, sodium, potassium, rubidium, cesium, magnesium, calcium, strontium, and barium, such as lithium hydroxide, sodium hydroxide, potassium hydroxide, magnesium hydroxide, potassium oxide, sodium oxide, potassium carbonate, sodium carbonate, sodium bicarbonate, potassium nitrate, potassium borate, sodium borate, potassium chloride, potassium acetate, sodium propionate, potassium maleate, etc. Of these, potassium, in the form of the oxide or in a form readily convertible to the oxide, is preferred. The aluminum borate can be treated with from about 0.05 to 50 wt. % dopant based on the weight of the aluminum borate. The alkali metal or alkaline earth metal compound can be dry blended with the aluminum borate; dissolved in a suitable solvent, preferably water, mixed with the aluminum borate and dried; or aqueous solutions of same can be added to feedstocks going to a reactor containing the aluminum borate catalyst.

In somewhat greater detail, the solid reagents comprising precursors of copper aluminum borate should be ground to a powder, individually or as a combination, through a 0.25 mm screen in a high speed grinder. It is important that uniform particle sizes of all reagents be attained in order that the solid-state reaction to form crystalline copper aluminum borate proceeds as uniformly as possible upon calcination.

Following grinding of the reagents, a superficially dry mixture is prepared comprising the powdered dry reagents in combination with about 3–20 wt. percent of a suitable binder. A suitable binder for use in the present invention is one capable of holding the powdered reagents together following compaction in a pellet press, extrusion apparatus, or similar compaction devices yet which will burn away upon calcination, thus imparting porosity to the pellet. The binder should be an essentially inert material which will not react with the other solid reagents upon calcination. Preferred binders are solid stearins and the like, as well as graphite, or mixtures thereof. Sterotex, a commercially available vegetable stearin, is particularly useful in the present invention and is generally preferred over graphite as it burns off at a lower temperature than graphite and results in a better catalyst. The amount of binder used should be at least about 3 wt. percent; however, up to 20 wt. percent of binder can be used before performance of the resulting catalyst is dramatically impaired. About 5 wt. percent of the binder is recommended.

The solid binder can be combined with the powdered reagents using a conventional mixing apparatus for a period of about 10 to about 60 minutes. Following the above-prescribed mixing of the powdered reagents and binder, the resulting superficially dry mixture should be compacted, i.e., either extruded or pelletized using conventional techniques and apparatus. The ultimate performance of the calcined copper aluminum borate catalyst will be affected by the catalyst density and crush strength of the precalcined pellets or extrudate. Preferably, where the catalyst is to be used for the dehydrogenation of alkylaromatics containing at least two carbon atoms in at least one alkyl group to alkenylaromatics such as disclosed in Satek U.S. Pat. No. 4,590,324, in particular for the conversion of para-ethyltoluene to para-methylstyrene, the catalyst density is desirably in the range of from about 0.48 g/ml to about 0.84 g/ml, and preferably in the range of about 0.56/g/ml to about 0.67 g/ml. Because crush strength generally increases with increasing catalyst density, crush strength can be measured during pelleting or extrusion to monitor catalyst density. A crush strength of between about 4.5 and 6.0 lbs. is preferred for copper aluminum borate intended for use in the conversion of alkylaromatics containing at least two carbon atoms in at least one alkyl group to alkenylaromatics.

After the catalyst precursor has been combined with a suitable binder and either extruded or pelleted, calcination is carried out a temperature in the range of from about 650° to about 1000° C., preferably at least about 700° C. if the catalyst is to be used for syngas conversion (as disclosed in commonly assigned co-pending Zletz U.S. Ser. No. 710,042), and at least about 800° C. if the catalyst is to be used for dehydrogenation (as disclosed in Satek U.S. Pat. No. 4,590,324), for about 0.1 to 24 hours, typically in air. The higher the calcination temperature the shorter the calcination time. Calcinations below about 800° C. tend to provide a catalyst that is more active in syngas conversion. Calcinations above about 800° C. tend to provide a green crystalline material that is more active in dehydrogenation reactions than the green crystalline material obtained below about 800° C. Other things being equal, the higher the calcination temperature, the lower the surface area and porosity of the copper aluminum borate. In the present invention the superficially dry copper aluminum borate precursor mixture is initially calcined at a temperature of about 300° for 3-4 hours to burn off binder and other volatiles, following which the temperature is increased to preferably between 780° and 860° C. for about 8 hours. We have found a preferred calcining temperature to be between from about 800° C. to about 840° C.

As disclosed in commonly assigned and copending applications to Zletz, U.S. Ser. Nos. 709,790 and 710,015, the calcined copper aluminum borate prepared in accordance with the dry-mix technique of the present invention can be used for oxidation, dehydrogenation, conversion of syngas, hydrogenation, etc. or treated with reducing gas, such as hydrogen or carbon monoxide at a temperature of from about 150° C. to 1000° C. to convert them into catalysts comprising finely divided metallic copper on a support comprising aluminum borate. The higher the temperature of the reducing gas and the more effective the reducing agent, the lower the concentration of copper aluminum borate and the higher the concentration of neat aluminum borate in the support. If the copper aluminum borate is used directly as a catalyst without pretreatment with a reducing gas, the copper aluminum borate is converted into a catalyst comprising finely divided copper on a support comprising aluminum borate by any reducing gas present in the reaction. For example, syngas and hydrogenation reactions use reducing gases while dehydrogenation produces hydrogen.

While it is not clear at this point whether copper aluminum borate or copper on aluminum borate or combination of the two is the true catalyst in all dehydrogenation reactions and reactions employing a reducing gas, it has generally been found that the induction period for carrying out these reactions is reduced by treating the copper aluminum borate with a reducing agent prior to the desired reaction. A particularly useful method of conditioning a catalyst prior to use or for regeneration of a used catalyst comprises sequentially treating the copper aluminum borate and/or copper on aluminum borate with oxygen-containing gas followed by a reducing agent, such as carbon monoxide or hydrogen, sequentially two or more times. At this point, it appears that it is immaterial whether or not the oxidation is carried out prior to or after the reduction step and, in fact, the calcination step which is generally carried out using air can be viewed as an oxidation step. However, it is preferred that the sequence end with a reduction step.

One of the problems observed with copper aluminum borate catalyst prepared according to the liquid method disclosed in Satek U.S. Pat. No. 4,590,324 is that the catalyst, when used for conversion of para-ethyltoluene (PET) to para-methylstyrene (PMS), generally falls below about 50 percent conversion after less than 100 hours on stream (usually about 50 hours). Although regeneration cycles can reactivate the catalyst, the maximum activity observed after regeneration is not as high as that observed with a fresh catalyst. Moreover, the regenerated catalyst tends to deactivate more quickly than a fresh catalyst and has a lower selectivity to PMS. Attempts to improve activity and selectivity as well as the lifetime between regenerations of copper aluminum borate used for conversion of PET to PMS by incorporation of small amounts of active metals in the catalyst proved difficult, insofar as incorporating even small amounts of such metals was found to lower substantially the selectivity of the catalyst to PMS, in some cases by as much as 20 percent.

In contrast to the above, among the advantages offered by the dry catalyst preparation of the present invention is that the resulting copper aluminum borate can be significantly enhanced by incorporation of active metals such that the catalyst (a) requires almost no activation period; (b) has higher initial activity and selectivity; (c) shows an increase in maximum activity after regeneration as compared with the liquid-prepared catalyst which typically undergoes a decrease of 5–10% after regeneration; and (d) has an increased lifetime (defined as the time required for the conversion of PET to drop below about 50%) upon regeneration. Unexpectedly, these benefits can be achieved without the severe loss in selectivity to PMS observed when similar metal incorporation is practiced on copper aluminum borate prepared from a liquid-mixed precursor.

Based on these findings, the solid-state preparation of copper aluminum borate according to the present invention preferably includes the step of incorporating in the catalyst an effective amount, preferably from about 0.01 to about 30 wt. percent, of a catalytically active metal or mixtures thereof. Generally speaking, above incorporation levels of about 5 wt. percent regenerability of the catalyst and selectivity to PMS deteriorate as the amount of incorporated metal increases.

The incorporation of active metals may be carried out using any active metal, metal compound, or mixtures thereof. The preferred metal is at least one member selected from the group consisting of platinum, palladium, molybdenum, and compounds thereof. Most preferred is a combination of about 0.2 wt. percent palladium and about 1.0 wt. percent molybdenum. The combination of palladium and molybdenum is particularly advantageous for conversion of PET to PMS. Palladium increases the lifetime of the catalyst upon regeneration as well as the maximum activity, while molybdenum is effective in reducing the catalyst activation period. The molybdenum/palladium doped catalyst requires virtually no activation period and responds very well to multiple regenerations which substantially extend the useful lifetime of the catalyst.

Incorporation of relatively low levels of platinum, i.e., about 0.01 to about 3.0 wt. percent, is found to enhance the selectivity of the catalyst to PMS, as well as to reduce the activation period. However, the improvement resulting from platinum incorporation, alone or in combination with other metals, is not as profound as that observed with palladium/molybdenum incorporation.

A number of factors govern the selection of a suitable metal or metal-containing compound. If incorporation of the metal compound is to be carried out by contacting the copper aluminum borate catalyst (or precalcined precursor) with a solution of the metal compound, then the compound should have a high solubility to effect a uniform distribution of the metal on the copper aluminum borate. The compound should also be non-volatile in order to reproducibly control the concentration of the dopant. If the metal compound is to be included as a dry solid in the dry-mixed copper aluminum borate precursor, which is generally preferred, the metal compound should not be hygroscopic as this causes difficulties in grinding and mixing the dry reagents. Finally, the metal compound should readily convert to its oxide upon calcination without producing undesirable residue, thus halogen- and sulfur-containing substances should be avoided. Without limitation, several examples of suitable metal compounds for use in the present invention are $Pd(NO_3)_2 \cdot H_2O$, $[Pd(OAc)_3]_2$, $(NH_4)_2MoO_4$, $Pt(NH_3)_4(NO_3)_2$, etc.

Briefly, incorporation of active metal or metal-containing compounds, or mixtures thereof, into copper aluminum borate catalyst according to the present invention can be carried out using any suitable doping or impregnation technique. Preferably, however, incorporation is accomplished (a) by impregnating calcined copper aluminum borate with a solution of the metal compound; (b) by treating the superficially dry (powdered) mixture of copper aluminum borate precursor reagents with a solution of the metal compound; or (c) by including the metal compound as a solid reagent in the dry-mix of copper aluminum borate precursor reagents, before the dry-mix is compacted and calcined.

Incorporation by method (a) above is generally preferred in the manufacture of smaller quantities of metal-impregnated copper aluminum borate. In a typical procedure, calcined catalyst is treated with an aqueous solution containing the desired metal compound by dispensing the solution from a syringe or other appropriate device evenly over the catalyst in an open, shallow vessel such as an evaporating dish. The volume of the solution applied to the catalyst should be about 10% greater than the available pore volume of the given weight of catalyst being treated (based on BET surface analysis). In this way, enough liquid is available to cover the catalyst uniformly without allowing the catalyst to be contacted with excess liquid resulting in deposition of the metal compound on the sides of the treating vessel. If the metal compound is insufficiently soluble to give the proper solution volume, the solution can be added to the catalyst in several stages with drying between additions. After the solution is added, the doped catalyst can be placed in a vacuum oven for about 1 to 3 hours to remove excess bulk water and then heated to 300° to 350° C. for several hours to decompose anion or organic species and to remove most of the remaining water, following which the impregnated catalyst can be calcined at a sufficiently high temperature to convert the metal compound to its oxide. In the case of water-insoluble metal compounds, organic solvents such as toluene may be substituted for water. Also, where more than one metal is to be added to the catalyst, a single solution of all the metals can be added at one time, or separate solutions can be added sequentially.

Incorporation by method (b) above is generally preferred in the manufacture of small to intermediate quantities of metal-impregnated copper aluminum borate, e.g., greater than about 25 grams. This technique involves treatment of the powdered dry-mix of copper aluminum borate precursor reagents with a solution containing the desired metal compound(s). The treatment, carried out before the powdered dry-mix is compacted or calcined, can be effected before or after the solid binder component is added to the dry-mix, preferably after. In a typical procedure, the powdered dry-mix of copper aluminum borate precursor reagents can be sprayed with a solution containing the metal compound(s). Gentle mixing or agitation of the powder while adding the liquid is helpful in providing a uniform application to the precursor. After the entire metal solution is added to the powdered precursor reagents, the powder can be dried to a suitable moisture content for pelleting. After drying, further mixing of the treated powder appears to further improve dispersion of the added metal. After pelleting, calcination of the metal-treated precursor can be carried out as described earlier.

Metal incorporation by method (c) above is particularly suited to large scale manufacture of metal-doped copper aluminum borate. This technique requires no liquids and is therefore generally preferred over the previously described techniques which require additional drying steps. In a typical procedure, the desired metal compound or a mixture of compounds is mixed as a dry solid with the other copper aluminum borate precursor reagents. The metal compound(s) can either be separately preground and then added to the powdered dry-mix of precursor reagents, or the compound plus the other reagents can be ground and mixed simultaneously. Hygroscopic materials are undesirable in this procedure as they render difficult proper grinding and mixing of the powdered reagents. Thus, substitutions such as palladium acetate for palladium nitrate are recommended.

EXAMPLE I

This example illustrates (1) preparation of copper aluminum borate catalyst according to the present invention; (2) preparation of the catalyst from a liquid-prepared precursor according to Satek U.S. Pat. No. 4,590,324; and (3) a comparison of the resulting catalysts for dehydrogenation of para-ethyltoluene (PET) to para-methylstyrene (PMS). The results of the comparison (Table I, below) indicate that copper aluminum borate prepared according to the dry-mix technique of the present invention results in a higher absolute conversion of PET at a given space velocity and a significantly lower deactivation rate than copper aluminum borate prepared by the liquid method of Satek.

(1) Preparation of copper aluminum borate according to the present invention was carried out as follows: 718.5 gm of copper acetate ($Cu(OAc)_2 H_2O$), 444.9 gm of boric acid ($H_3BO_3$) and 805.0 gm of Davison VFA alpha alumina ($Al_2O_3$-31.6% $H_2O$) were ground thoroughly through a 0.25 mm screen in a high speed grinder to assure that all reagents were ground to a similar particle size for uniform mixing. The ground reagents were then dry-mixed with 5 wt. percent finely ground Sterotex. Mixing of the Sterotex and the ground reagents was carried out in a jar mixer for about 30 minutes. The resulting liquid free precursor mixture was then formed into ⅛-inch diameter by 3/16-inch length pellets using a Stokes Model 521-2 four-ton single-punch powder compacting press. Crush strength of the pellets was maintained between 4.5 and 6.0 pounds. An Ametek Accuforce Cadet (40-pound) force gauge was used to monitor crush strength of the pellets. The pelletized precursor was then calcined at 300° for about 3 to 4 hours to burn off the Sterotex and any other volatile components, following which the temperature was increased gradually to 820° C. over a 3 hour period and then maintained there for a period of about 8 hours.

(2) Preparation of copper aluminum borate in accordance with the procedures disclosed in Satek U.S. Pat. No. 4,590,324 was carried out using the following reagents: 6,352 gm of PHF alumina sol (cyanamid) containing 7.8 percent solids; 400 gm of boric acid ($H_3BO_3$); 3,384 ml of $H_2O$; 960 ml of aqueous $NH_3$ (15M); and 646.4 gm of copper acetate ($Cu(OAc)_2H_2O$). The boric acid was dissolved in 2,100 ml of hot water (about 60° C.). The copper acetate was dissolved in 1,300 ml of warm water and a small portion of the aqueous ammonia was added to complete dissolution and prevent decomposition of the copper acetate. The alumina sol was added to a Waring blender to which was then added the boric acid solution followed by mixing for about 30 seconds. The copper acetate solution and remaining ammonia were then added to the blender whereupon gellation commenced. The gel was initially hand stirred and then mixed in the blender to a uniform consistency. The gel was then spread out to dry in a uniform ⅛-inch layer. Following drying, the precursor was calcined initially at 300° C. for 3 to 4 hours followed by calcining at 820° C. for 4 hours.

(3) About 25 cc of catalyst prepared according to the above procedures were placed in a 20 by ¾-inch quartz reaction tube which was heated at 625° C. in a tube furnace. The catalysts were evaluated for conversion of PET to PMS by passing a mixture of PET and nitrogen (14:1 molar ratio of $N_2$:PET) over the catalyst bed at a WHSV of 0.15. Products were collected and analyzed by gas chromatography.

Table I below illustrates that copper aluminum borate prepared according to the solid state method of the present invention ("dry prep") results in a higher absolute conversion of PET at a given space velocity and a significantly lower rate of deactivation compared with copper aluminum borate prepared by the liquid technique ("wet prep").

TABLE I

Dehydrogenation of Para-Ethyltoluene to Para-Methylstyrene*

| WET PREP | | DRY PREP | |
|---|---|---|---|
| Time (hrs.) | Conversion (%) | Time (hrs.) | Conversion (%) |
| 24 | 60 | 50 | 62 |
| 29 | 55 | 115 | 54 |
| 50 | 48 | 160 | 53 |
| 70 | 41 | 182 | 48 |
| 99 | 33 | 210 | 45 |
| 128 | 30 | | |

*625° C., WHSV = .15, Diluent Ratio 14/1
Both catalysts had selectivities (to PMS) in the range of 90 ± 3%.

EXAMPLE II

Calcined copper aluminum borate prepared by the solid state preparation of the present invention was impregnated with about 0.2 wt. percent of either palladium, molybdenum or ruthenium using a solution of the dissolved metal salt. Copper aluminum borate was prepared from a dry-mixed precursor as described in Example I above. To about 15 gm of the pelletized calcined catalyst was added 61.3 mg ammonium molybdate dissolved in 12 ml distilled water, carefully covering all exposed surfaces. The catalyst was placed in a vacuum oven at about 100° to 110° C. for about 1 hour, then transferred to a calcining oven at 350° C. for 2 to 3 hours to burn off volatile materials. Catalyst impregnated with 0.2 percent ruthenium and palladium were similarly prepared following the above procedure by substituting appropriate amounts of palladium nitrate and ruthenium nitrate, for the molybdenum salt.

EXAMPLE III

Preparation of copper aluminum borate according to the solid state method described herein and incorporating about 0.2 wt. percent palladium and about 1.0 wt. percent molybdenum via inclusion of solid molybedenum and palladium compounds with dry copper aluminum borate precursor reagents, was carried out as follows: Copper acetate, 36 gm, boric acid, 22.3 gm, Davison VFA alumina, 41.7 gm, were mixed in a jar. Following mixing, ammonium molybdate, 1.8 gm, and palladium (II) acetate, 0.42 gm, were dry mixed with the copper aluminum borate precursor reagents. After all the reagents were mixed, the reagents were then ground for about 30 seconds through a 0.25 mm screen. To the milled mixture was added 5.11 gm of Sterotex as binder followed by thorough dry-mixing of all the ingredients. The dry-mixed precursor mixture was then formed into pellets having a crush strength between 4.5 and 7.0 pounds. The pellets were calcined at 300° C. for about 3 to 4 hours and then at 820° C. for 8 hours.

EXAMPLE IV

This example illustrates that copper aluminum borate prepared from a liquid-mixed precursor in accordance with Satek U.S. Pat. No. 4,590,324 undergoes a lowering in selectivity for the reaction of PET to PMS when the catalyst is impregnated with 0.2 percent palladium, molybdenum or ruthenium, while copper aluminum borate prepared by the solid state method of the present invention, when similarly impregnated, exhibits increased life time between regenerations (as compared to the unimpregnated dry prep catalyst) and does not undergo any loss in selectivity to PMS.

Copper aluminum borate was prepared both by the dry and wet methods described in Example I above, following which samples of both catalysts were impregnated with 0.2 percent palladium, 0.2 percent molybdenum and 0.2 percent ruthenium using the impregnation procedures described in Example II, above. Table II below sets forth comparative data indicating a lowering of selectivity for the impregnated liquid-prep catalyst, while no effect on selectivity is observed for the dry-prep impregnated catalyst.

TABLE II

| Catalyst | Conversion of PET | Selectivity to PMS |
| --- | --- | --- |
| Solid Prep | 58%(57%)[a] | 85%(87%) |
| Liquid Prep | 58%(55%) | 87%(85%) |
| Solid Prep with .2% Pd | 55%(55%) | 86%(85%) |
| Liquid Prep with .2% Pd | 58%(58%) | 75%(75%) |
| Solid Prep with .2% Mo | 59%(60%) | 88%(88%) |
| Liquid Prep with .2% Mo | 55%(50%) | 73%(71%) |
| Solid Prep with .2% Ru | 55%(55%) | 86%(86%) |
| Liquid Prep with .2% Ru | 62%(49%) | 71%(62%) |

[a]Values in parentheses were obtained after regeneration. Data for fresh catalyst and regenerated catalyst was taken after catalyst had been on stream for 48 hours.

EXAMPLE V

This example illustrates that active metals such as palladium and molybdenum can be included in copper aluminum borate prepared according to the present invention to increase the maximum activity of the catalyst for the hydrogenation of PET to PMS, to extend the lifetime of the catalyst between regenerations without lowering selectivity of the catalyst to PMS, and also to reduce the time required for catalyst activation.

Copper aluminum borate was prepared in accordance with the techniques set forth in Example I above. The catalyst, which was not impregnated, was evaluated for conversion and selectivity in the reaction of PET to PMS at 625° C., WHSV=0.15 and molar ratio of nitrogen: PET of 14:1. As can be seen from Table III-A below, regeneration of the unimpregnated dry-prep catalyst does not increase catalyst life time beyond that of fresh catalyst. For purposes of this discussion, the term "catalyst lifetime" is intended to mean the period of time for which the catalyst results in conversion of at least about 50 percent and a selectivity to PMS of at least about 80 to 90 percent.

TABLE III-A

| Dry-Mixed Copper Aluminum Borate (no active metal added) | | |
| --- | --- | --- |
| Time (hrs.). | Conversion (%) | Selectivity (%) |
| Fresh Catalyst | | |
| 18 | 69 | 81 |
| 92 | 51 | 88 |
| First Regeneration | | |
| 24 | 63 | 82 |
| 95 | 51 | 88 |
| Second Regeneration | | |
| 48 | 60 | 85 |
| 95 | 50 | 88 |

By way of comparison with the above, samples of copper aluminum borate prepared from a dry-mixed precursor as described in Example I were impregnated with 0.2, 0.05 and 2.0 wt. percent palladium and evaluated for the reaction of PET to PMS. The results are set forth in Tables III-B, III-C, and III-D below.

TABLE III-B

| Dry-Mixed Copper Aluminum Borate (0.2% Palladium Impregnation) | | |
| --- | --- | --- |
| Time (hrs.) | Conversion (%) | Selectivity (%) |
| Fresh Catalyst | | |
| 48 | 49 | 90 |
| 93 | 50 | 90 |
| 117 | 46 | 87 |
| First Regeneration | | |
| 48 | 65 | 86 |
| 107 | 57 | 91 |
| 122 | 52 | 92 |
| 151 | 52 | 92 |
| Second Regeneration | | |
| 49 | 67 | 90 |
| 95 | 58 | 91 |
| 119 | 59 | 90 |
| 151 | 54 | 87 |
| 175 | 49 | 88 |

TABLE III-C

| Dry-Mixed Copper Aluminum Borate (2.0% Palladium Impregnation) | | |
| --- | --- | --- |
| Time (hrs.) | Conversion (%) | Selectivity (%) |
| Fresh Catalyst | | |
| 47 | 64 | 75 |
| 77 | 48 | 79 |
| First Regeneration | | |
| 46 | 54 | 80 |

TABLE III-D

| Dry-Mixed Copper Aluminum Borate (.05% Palladium Impregnation) | | |
| --- | --- | --- |
| Time (hrs.) | Conversion (%) | Selectivity (%) |
| Fresh Catalyst | | |
| 44 | 60 | 88 |
| 71 | 52 | 87 |
| 95 | 47 | 89 |
| First Regeneration | | |
| 47 | 60 | 87 |
| 71 | 54 | 89 |

As can be seen from Table III-B above, regeneration of a 0.2 wt. percent palladium impregnated catalyst increases the life time of the catalyst by at least a factor of 2 with no loss in selectivity to PMS. In addition, the regenerated palladium-impregnated catalyst is far more active than the first catalyst. From the data in Tables III-C and III-D above, it appears that the optimum level of palladium impregnation is quite low. Palladium loadings as high as about 2 percent lower the selectivity of the catalyst and impair regenerability while loadings as low as 0.05 percent appear to afford little or no improvement in catalyst performance.

EXAMPLE VI

Copper aluminum borate incorporating small amounts of both palladium (0.2 wt. percent of the dry-mixed copper aluminum borate precursor) and molybdenum (1.0 wt. percent of the precursor) was prepared according to Example III, above and was evaluated for dehydrogenation of PET to PMS using the methods described in Example I. The performance of the fresh catalyst and one regeneration thereof is summarized in Table IV below. The data indicate that dry-mixed copper aluminum borate containing a mixture of relatively small amounts of molybdenum and palladium requires little if any activation time before conversion of greater than 50 percent and selectivities of about 90 percent are obtained. Activation time in the catalyst without the molybdenum/palladium combination is typically about 50 hours.

TABLE IV

Dry-Mixed Copper Aluminum Borate
1.0% Molybdenum and 0.2% Palladium

| Time (hrs.) | PET Conversion | PMS Selectivity |
|---|---|---|
| | Fresh Catalyst | |
| 5 | 79 | 88 |
| 48 | 64 | 91 |
| 120 | 47 | 90 |
| | First Regeneration | |
| 5 | 80 | 90 |
| 48 | 60 | 90 |
| 120 | 47 | 90 |

What is claimed is:

1. Solid state preparation of copper aluminum borate catalyst comprising: dry mixing solid reagents comprising suitable precursors of copper oxide (CuO), aluminum oxide ($Al_2O_3$) and boron oxide ($B_2O_3$) with a solid binder which aids compaction of the solid reagents, is essentially inert to said reagents, and burns away upon calcination, said dry mixing resulting in formation of a superficially dry copper aluminum borate precursor; compacting the dry precursor; and calcining the precursor at a sufficiently high temperature to form crystalline copper aluminum borate.

2. The method of claim 1 wherein the binder is at least one member selected from the group consisting of stearin compounds and graphite.

3. The method of claim 1 wherein the solid reagents are dry-mixed with about 3 to about 20 wt. percent on a dry solids basis of said essentially inert solid binder.

4. The method of claim 3 wherein the solid reagents are dry-mixed with about 5 wt. percent of a solid stearin compound.

5. The method of claim 1 wherein the precursor is formed into pellets prior to calcining.

6. The method of claim 5 wherein the pellets have density in the range of 0.48 g/ml. to 0.84 g/ml.

7. The method of claim 6 wherein the pellets have a density in the range of 0.56 g/ml to 0.67 g/ml.

8. The method of claim 1 wherein the calcining temperature is in the range of from about 650° to about 900° C.

9. The method of claim 8 wherein the calcining temperature is in the range of from about 780° to about 860° C.

10. The method of claim 9 wherein the calcining temperature is in the range of about 800° to about 840° C.

11. The method of claim 1 wherein the solid reagents further comprise one or more active metals or metal compounds in an amount which is effective to improve the catalyst.

12. The method of claim 11 wherein the metal or metal compound is at least one member selected from the group consisting of platinum, palladium and molybdenum, and compounds thereof.

13. The method of claim 12 wherein the metal comprises platinum or compounds thereof.

14. The method of claim 12 wherein the metal comprises palladium or compounds thereof.

15. The method of claim 12 wherein the metal comprises molybdenum or compounds thereof.

16. The method of claim 12 wherein the metals comprise palladium and molybdenum, or compounds thereof.

17. The method of claim 12 wherein the metal or metal compounds provide about 0.2 percent palladium and about 1.0 percent molybdenum by weight of the copper aluminum borate precursor.

18. The method of claim 1 wherein the copper aluminum borate precursor is impregnated with a solution containing one or more active metals or metal compounds such that the amount of metal impregnated in the precursor is effective to improve the catalyst.

19. The method of claim 18 wherein the metal is at least one member selected from the group consisting of platinum, palladium, molybdenum and compounds thereof.

20. The method of claim 19 wherein the metals are palladium and molybdenum, or compounds thereof.

21. The method of claim 19 wherein the impregnated metal or metal compounds provide about 0.2 percent palladium and about 1.0 percent molybdenum by weight of the precursor.

22. The method of claim 1 wherein one or more active metals or metal compounds are added to the calcined copper aluminum borate in amount effective to improve the catalyst.

23. The method of claim 22 wherein the metal is at least one member selected from the group consisting of platinum, palladium, molybdenum, and compounds thereof.

24. The method of claim 23 wherein the metals comprise palladium and molybdenum.

25. The method of claim 23 wherein the copper aluminum borate is incorporated with about 0.2 wt percent palladium and about 1.0 wt. percent molybdenum.

26. Solid state preparation of a copper aluminum borate catalyst precursor comprising dry mixing solid reagents comprising suitable precursors of copper oxide (CuO), aluminum oxide ($Al_2O_3$) and boron ($B_2O_3$) with a solid binder essentially inert to the solid reagents, to result in formation of a superficially dry copper aluminum borate precursor, said inert binder therein being a combustible material which will burn off upon calcination of the precursor.

27. The method of claim 26 wherein the binder is at least one member selected from the group consisting of stearin compounds and graphite.

28. The method of claim 26 wherein the solid reagents are dry mixed with about 3 to about 20 wt. percent on a dry solids basis of said inert solid binder.

29. The method of claim 28 wherein the solid reagents are dry-mixed with about 5 wt. percent of a solid stearin compound.

30. The method of claim 26 wherein the solid reagents further comprise one or more active metals, or metal compounds, in an amount which is effective to improve the catalyst obtained upon calcination of the precursor.

31. The method of claim 30 wherein the active metal is at least one member selected from the group consisting of platinum, palladium, molybdenum, and compounds thereof.

32. The method of claim 31 wherein the metals comprise palladium and molybdenum or compounds thereof.

33. The method of claim 31 wherein said metal or metal compound provides a combination of about 0.2 wt. percent palladium and about 1.0 wt. percent molybdenum by weight of the precursor.

* * * * *

UNITED STATES PATENT OFFICE
CERTIFICATE OF CORRECTION

Patent No. 4,755,497         Dated   July 5, 1988

Inventor(s)   Richard E. De Simone, Eric J. Moore and Bruce I. Rosen

It is certified that error appears in the above-identified patent and that said Letters Patent are hereby corrected as shown below:

Patent reads:

Col. Line

| | | |
|---|---|---|
| 1 | 55 | "-aboria" and should read --boria-- |
| 9 | 55 | "out a" and should read --out at a-- |
| 17 | 67-68 | "have density" and should read --have a density-- |

Signed and Sealed this

Fourteenth Day of March, 1989

Attest:

DONALD J. QUIGG

Attesting Officer     Commissioner of Patents and Trademarks